Patented June 3, 1952

2,598,981

UNITED STATES PATENT OFFICE 2,598,981

MAGNESIA CEMENT PRODUCTS AND THEIR MANUFACTURE

Paul S. Denning, Joliet, Ill., assignor to F. E. Schundler and Company, Incorporated, Joliet, Ill., a corporation of Illinois No Drawing. Application February 26, 1949, Serial No. 78,680

4 Claims. (Cl. 106—86)

This invention relates to magnesia cement products and among other objects, aims to improve the plasticity and workability of cementitious products of this character.

Another object of the invention is to prevent damage to the product by heat generated during the reaction or setting of the cement.

The nature of the invention may be readily understood by reference to illustrative products and their manufacture.

Magnesium oxychloride and oxysulphate cements are old and well known. In general, they comprise mixtures of magnesium oxide (plastic calcined or caustic magnesia), magnesium chloride or magnesium sulphate solutions, and various aggregates or mixtures of aggregates. In making these cements optimum strengths require a fairly definite ratio between the magnesium oxide or magnesite, and the concentration of the magnesium chloride, or magnesium sulphate solutions. This presents a number of problems:

The cement, including the aggregate, may not be sufficiently plastic or workable since sufficient liquid (water) on which the plasticity or workability of the cement depends, is not present in the solution. Greater dilution to provide the desired plasticity even though the ratio between magnesite and magnesium chloride, for example, be not reduced, would nevertheless, reduce the concentration of the magnesium chloride solution (or magnesium sulphate solution as the case may be) and thereby produce either a weaker or a very slow setting cement, or both. Indeed, in a magnesium oxychloride cement, if the concentration of the magnesium chloride solution be below 18 degrees Bé. (Baumé), it is practically impossible to obtain a reaction between the magnesium chloride and magnesite. On the other hand, if the concentration be substantially above 22 degrees Bé., there is insufficient liquid to produce a workable mixture. Yet for still greater strength, somewhat greater concentrations would be desirable.

Another problem is obtaining adequate and thorough distribution of a properly proportioned cement over some aggregates, particularly where it is desired to limit the amount of cement to the minimum necessary properly to bond the aggregate.

Still another problem is preventing damage to the cement due to excessive temperatures inside the material when the heat generated by the reaction is not properly or adequately dissipated. Too high temperatures during the development of the cement produce weak and worthless cements. This is particularly true of magnesium oxychloride cements though it is also true of magnesium oxysulphate cements.

To improve the plasticity or workability of the cementitious mixture, I incorporate foam in the cement. While the foam may be incorporated in the cement in various ways, I have found it advantageous to add a foaming agent to the slurry comprising magnesium oxide and magnesium chloride solution (or magnesium sulphate solution, as the case may be). The foam may be developed with mechanical or other agitation which entrains air in the slurry. Increase of plasticity and workability of these cements by incorporation of foam makes it possible to distribute a much less amount of cement over a given volume of aggregate. The amount of cement actually necessary to bond two particles together is very small; and the aggregate volume of cement theoretically necessary to bond a given aggregate together is very much less than that actually necessary heretofore to effect sufficiently complete distribution of some bonding material over the surfaces of all the particles of aggregate to develop an adequate bond. The foam provides adequate volume of bonding material for this purpose, and unlike other fillers it does so without dilution of the important concentration of the magnesium chloride or magnesium sulphate solution and without absorbing any of the cement or either of its constituents, thereby making the entire amount of the cement available for bonding the aggregate.

For this purpose it is preferable to use a foaming agent to provide a foam which breaks down after distribution of the foamed cement over the solid aggregate particles, thus leaving all of the cement in its most efficient form for bonding the aggregate and making it possible to obtain adequate bonding with only about one-sixth of the cement which has heretofore been necessary properly to bond a given volume of aggregate. Furthermore the porosity of the molded product may, if desired, be much greater than heretofore, since there is a smaller volume of cement to reduce porosity of the material. The aggregates used in such products are themselves very porous and bulky, presenting very large surface areas which have heretofore required a large volume of cementitious material merely to bond the aggregates together. Such a large volume of cement alone tends to defeat the purposes of the product, since it would substantially impair its porosity.

Where maximum porosity is not necessary in the final product, it may be formed with application of pressure on molding with a corresponding increase in strength. This is particularly applicable to products employing porous or non-porous aggregates, where greater strength is desired, to permit bonding of the aggregates together with a minimum amount of cement. In such cases, strength, being of greater importance, the application of pressure brings the particles of aggregate into more effective bonding contact for the most efficient use of the minimum amount of cement which the present invention makes it possible to distribute.

With cements of this character elimination of excess or unnecessary cement is important aside from considerations of weight, cost and porosity. These cements in neat condition (and that is their condition as a bonding agent) develop high internal stresses (with danger of fracture) if the thickness of the neat cement be substantial. The present invention makes it possible to reduce the thickness of the cement coating on the particles of aggregate to the point where such internal stresses cannot develop.

The large amounts of magnesium oxychloride or magnesium oxysulphate cement heretofore necessary to bond a porous or insulating aggregate are also objectionable because the excessive amount of heat generated by reaction of the cement ingredients could not be dissipated or radiated sufficiently rapidly (due to the insulating character of the material itself) to prevent weakening of the cement. While high temperatures accelerate reaction, in both magnesium oxychloride and magnesium oxysulphate cements, the cement thus formed is very weak. Excessive heat does not develop however (even though an insulating aggregate of high thermal efficiency be used) with the reduction in amount of cement made possible by the present invention. The aggregate has a high enough specific heat to absorb the heat generated from the smaller amount of cement without the necessity of conducting away or radiating such heat. This is particularly important in making relatively thick molded material, i. e., 1½" and thicker.

One class of foaming agents suitable for forming a foam which breaks after it has served its purpose, is the class of non-ionic wetting agents (these being generally insensitive to electrolytes such as magnesium chloride and magnesium sulphate solutions), of which the following are examples: an alkyl aryl polyether alcohol, such as that sold by Rohm and Haas under the trade name "Triton NE"; and a polyglycol ether such as that placed on the market by General Aniline and Film Corporation (Antara Products Division) under the trade name "Antarax A-280." These agents generally produce a coarser and therefore more plastic and workable cementitious foam than agents which develop a fine textured and more stable foam. There are many others of varying degrees of foaming power, foam stability and texture. For products wherein it is desired to have the foam remain until the cement has set, foaming agents which produce a more stable foam may be employed. Such agents fall in the class of non-ionic foaming agents, these being likewise generally insensitive to electrolytes such as magnesium chloride and magnesium sulphate solutions. Examples of such agents are: hydrolyzed soybean protein, such as that put on the market by National Foam Systems under the trade name Fomon FB2; and a hydrolyzed or enzyme degraded vegetable protein put on the market by American-LaFrance-Foamite Corporation under the trade name "Airfoam." About 2% of the former foaming agent on the chloride solution will produce a very fine grained stable foam which is not substantially broken down on mechanical mixing and remains substantially without shrinkage until the cement has set. The cement pores thus formed are generally non-communicating. About ½ of 1% of the latter foaming agent on the chloride solution will produce a very satisfactory stable foam whose texture is not quite as fine as that produced by the hydrolyzed soybean protein.

Many cheap materials in the nature of industrial wastes or byproducts may be employed as sources of proteinaceous material from which to obtain the vegetable protein foaming agent. Among these are distillery slops (i.e., corn gluten) soybean, linseed, flaxseed, cottonseed, castor and other seed meals remaining after expressing the seed oil. The protein molecules are preferably hydrolyzed or otherwise split or degraded (as by enzymes) to a form suitable for foaming. In their split or degraded form the protein molecules are "solubilized" and may easily be "dissolved" or suspended in liquid and under agitation will develop a voluminous and stable foam.

Various aggregates heretofore employed in molded cementitious products may be employed. For insulating and acoustical products light weight porous aggregates are of course preferable. One porous aggregate which gives excellent results is expanded perlite. Perlite is of volcanic origin, being an obsidian containing from 2 to 5% of water and sufficient alkali to cause it to soften at lower temperatures than that required for glass. On heating to such temperatures (e. g. 1600° F.) the steam inside the granules of perlite causes the latter to swell to many times their original size. The perlite granules are generally sealed and thus do not absorb cement on their interior. Nevertheless, they present a large external surface area which requires a large volume of cementitious foam for thorough distribution of a bonding coating. This is particularly true in acoustical material where a relatively coarse granule size is used to increase the number of open and communicating pores or interstices in the body of the material. It will be understood that perlite is simply illustrative of the class of insulating aggregates.

The following is illustrative of the "extending" ability of the foam. A given volume of magnesium oxychloride cement, comprising 1 part by weight of magnesium oxide and 2 parts by weight of magnesium chloride solution of 22° Bé. concentration, when mixed with less than twice (i. e., 1.85 volumes) its volume of non-absorbent aggregate will produce a cementitious concrete having a plasticity or flow of 80% (A. S. T. M. measure of cement plasticity). The volume of the same cement mixed with a small amount of foaming agent (e. g. 2% on the chloride solution of a polyglycol ether such as "Antarax A-280") and mechanically agitated to produce seven volumes of foamed cement, may be mixed with between eleven and twelve volumes of the same aggregate and produce a mixture having greater plasticity or flow (92.9%) than that produced with the unfoamed cement. After molding and breakdown of the foam bubbles, the cement is available to provide as strong a bond as in the unfoamed concrete, for the bonding strength depends not so much on the thickness of the bonding film of cement as its efficient distribution over the particles of aggregate and their juxaposition by pressure or vibration into effective bonding contact.

The following is one example of the manufacture of a product suitable for use as a roof insulating slab. Such a slab must possess greater strength than insulation which is not required to carry any load, but it must have good thermal insulating efficiency. For such purpose it is desirable to use a foaming agent such as an alkyl aryl polyether alcohol (e. g. Triton NE) to provide a foam which will break down promptly after mixing and molding so that on the application of pressure to bring the particles of aggregate into bonding contact, there will be no air bubbles in the mass to interfere with efficient bonding contact. The cementitious mixture may advantageously comprise magnesium oxychloride cement (containing about four parts magnesium chloride in a 22° Bé. solution to five parts by weight of magnesium oxide), to which is added about 1/3 of 1% on the magnesium chloride solution of the Triton NE foaming agent. The resulting slurry is then foamed by mechanical agitation to about eight times its original volume, after which it is mixed with about 60% of its foamed volume of a relatively strong aggregate such as perlite weighing about 12 pounds per cubic foot. Thereafter the cementitious mixture is molded and by that time the foam has broken down so that upon application of light pressure the molded mixture is consolidated and the granules of perlite are brought into efficient bonding contact to provide a strong roof slab. Even though the slab be quite thick, i. e., 2⅝" in thickness, the perlite was capable of absorbing the heat generated on setting of the cement without any substantial elevation in temperature.

The foregoing and other insulating products may advantageously be reinforced additionally by mixing a small amount of glass wool fiber in the cement. Such fiber has great strength and the cement bonds well with it. In the above product less than 15% of the glass wool fiber on the weight of the perlite need be used to provide great additional strength.

Another illustrative insulating product may be formed from a cementitious slurry containing seven parts by weight of magnesium oxide and five parts by weight of flake magnesium chloride in a 22° Bé. solution, and about 2% of a non-ionic wetting agent such as Triton NE. The slurry is mechanically agitated or whipped to develop about 6 or 7 volumes of foamed cement. To the foamed cement somewhat less than two parts by weight (e. g. 1.9 parts) of expanded perlite (weighing 3.4 pounds per cubic foot) is added and then mixed to distribute the cementitious foam over the granules of aggregate. Thereafter the cementitious mixture is molded. No substantial increase in temperature occurs during setting of the cement. Additional strength may be obtained by mixing a small amount of glass fiber with the cement.

It will be understood that the nature of the aggregate used depends considerably on the desired characteristics of the final product. Where greater strength is necessary, the aggregate must have corresponding strength, even though this results in a lower insulating efficiency and greater weight. On the other hand, where the material need have only such strength as is necessary to permit handling and installation, a lighter aggregate, such as that used in the product last described above (perlite weighing 3.4 pounds per cubic foot) may be used. Such product cannot be substantially compressed after molding to improve bonding contact of the partices of aggregate, without reduction in porosity.

Obviously the invention is not limited to the details of the illustrative products and their methods of manufacture, since these may be variously modified. Moreover, it is not indispensable that all features of the invention be used conjointly, since various features may be used to advantage in different combinations and subcombinations.

Having described my invention, I claim:

1. The method of making thermal insulating material comprising an insulating aggregate bonded with a magnesia cement which evolves a substantial amount of heat on setting, which method comprises mixing magnesium oxide, an aqueous solution of a magnesium salt selected from the group consisting of magnesium chloride and magnesium sulphate, and a small amount of a foaming agent to form a cementitious slurry, said foaming agent being capable of forming said slurry into an unstable cementitious foam, converting said slurry into such a foam, mixing such cementitious foam with a volume of insulating aggregate in granular form to distribute the foam over the surfaces of the granules of the aggregate, and then molding the mixture, the volume of aggregate being of the order of six times greater than the volume of granules of aggregate which could be covered and bonded by the same cementitious slurry in unfoamed condition, said foam persisting until after the completion of mixing with the aggregate and then collapsing, and then lightly pressing the molded material to bring the granules into efficient bonding contact, the amount of aggregate being sufficient to absorb and dissipate the heat evolved on setting of the cement without development of temperatures which would damage the cement.

2. The method of making thermal insulating material comprising an insulating aggregate bonded with a magnesia cement which evolves a substantial amount of heat on setting, which method comprises mixing magnesium oxide, an aqueous solution of a magnesium salt selected from the group consisting of magnesium chloride and magnesium sulphate, and a small amount of a foaming agent to form a cementitious slurry, said foaming agent being capable of forming said slurry into an unstable cementitious foam, converting said slurry into such a cementitious foam, mixing such cementitious foam with a volume of insulating aggregate in granular form to distribute the foam over the surfaces of the granules of the aggregate, then while the foam collapses molding the mixture into pieces one and one-half inches or greater in thickness, the said thickness being so great that it would result in development of destructive temperatures if the aggregate were bonded with the amount of said cement which would be necessary in unfoamed condition to cover and bond the aggregate, and then lightly pressing the molded material to bring the granules into efficient bonding contact, the amount of aggregate being sufficient to absorb and dissipate the heat evolved on setting of the cement without development of temperatures which would damage the cement.

3. The method of making thermal insulating material comprising an insulating aggregate bonded with a magnesia cement which evolves a substantial amount of heat on setting, which method comprises mixing magnesium oxide, an aqueous solution of a magnesium salt selected from the group consisting of magnesium chloride and magnesium sulphate, and a small amount of a non-ionic foaming agent to form a cementitious slurry, said foaming agent being capable of forming said slurry into an unstable cementitious foam, converting said slurry into such a cementitious foam having a volume about six times greater than the original volume of the slurry, mixing such cementitious foam with a volume of insulating aggregate in granular form equivalent to about 60% of the volume of the foam to distribute the foam over the surfaces of the granules of the aggregate, then while the foam collapses molding the mixture into pieces one and one-half inches or greater in thickness, the said thickness being so great that it would result in development of destructive temperatures if the aggregate were bonded with the amount of said cement which would be necessary in unfoamed condition to cover and bond the aggregate, and then lightly pressing the molded material to bring the granules into efficient bonding contact, the amount of aggregate being sufficient to absorb and dissipate the heat evolved on setting of the cement without development of temperatures which would damage the cement.

4. A thermal insulation comprising an aggregate of granules of expanded perlite bonded with magnesia cement comprising magnesium oxide and a magnesium salt selected from the group consisting of magnesium chloride and magnesium sulphate, the cement having been distributed over the granules in the form of an unstable foam in a quantity about one-sixth that which would have been required to cover the granules for bonding if the cement had been unfoamed, said insulation being at least one and one-half inches in thickness and said cement being insufficient to develop dangerous rise in temperatures on setting.

PAUL S. DENNING.

REFERENCES CITED

The following references are of record in the file of this patent:

UNITED STATES PATENTS

| Number | Name | Date |
|---|---|---|
| 2,292,011 | Parsons | Aug. 4, 1942 |
| 2,292,012 | Parsons | Aug. 4, 1942 |
| 2,337,915 | Menger | Dec. 28, 1943 |
| 2,451,445 | Parsons | Oct. 12, 1948 |

FOREIGN PATENTS

| Number | Country | Date |
|---|---|---|
| 525,638 | Great Britain | 1940 |

OTHER REFERENCES

Ralston: Bureau of Mines Information, Circular No. 7364, August 1946; page 7.